US008468562B2

(12) United States Patent
Miller et al.

(10) Patent No.: US 8,468,562 B2
(45) Date of Patent: Jun. 18, 2013

(54) USER INTERFACES FOR WEB-BASED VIDEO PLAYER

(75) Inventors: Christoform Miller, San Francisco, CA (US); Shivakumar Rajaraman, San Francisco, CA (US); Jasson Schrock, Mountain View, CA (US); Virginia Wang, San Francisco, CA (US)

(73) Assignee: Google Inc., Mountain View, CA (US)

( * ) Notice: Subject to any disclaimer, the term of this patent is extended or adjusted under 35 U.S.C. 154(b) by 722 days.

(21) Appl. No.: 12/114,398

(22) Filed: May 2, 2008

(65) Prior Publication Data

US 2008/0276269 A1 Nov. 6, 2008

Related U.S. Application Data

(60) Provisional application No. 60/915,654, filed on May 2, 2007.

(51) Int. Cl.
*H04N 7/10* (2006.01)
*H04N 7/025* (2006.01)
*G06Q 30/00* (2012.01)

(52) U.S. Cl.
USPC .......................................... 725/32; 705/14.4

(58) Field of Classification Search
USPC .......................................................... 725/32
See application file for complete search history.

(56) References Cited

U.S. PATENT DOCUMENTS

| | | | |
|---|---|---|---|
| 5,638,523 A | 6/1997 | Mullet et al. | |
| 5,790,122 A | 8/1998 | Cecchini et al. | |
| 5,801,747 A | 9/1998 | Bedard | |
| 6,057,872 A | 5/2000 | Candelore et al. | |
| 6,091,416 A | 7/2000 | Cragun | |
| 6,097,390 A | 8/2000 | Marks | |
| 6,282,713 B1 | 8/2001 | Kitsukawa et al. | |
| 6,393,158 B1 | 5/2002 | Gould et al. | |
| 6,615,270 B2 | 9/2003 | Gould et al. | |
| 6,621,980 B1 | 9/2003 | Gould et al. | |
| 6,698,020 B1 | 2/2004 | Zigmond et al. | |
| 7,043,746 B2 * | 5/2006 | Ma | 725/22 |
| 7,356,477 B1 | 4/2008 | Allan et al. | |
| 7,467,218 B2 | 12/2008 | Gould et al. | |
| 7,519,273 B2 | 4/2009 | Lowthert et al. | |

(Continued)

FOREIGN PATENT DOCUMENTS

| | | |
|---|---|---|
| JP | 2002-063452 A | 2/2002 |
| JP | 2002-094964 A | 3/2002 |

(Continued)

OTHER PUBLICATIONS

Van Buren, Sadalit. "YouTube's external video player = seductive user interface design." A Matter of Degree Blog. Dec. 27, 2006. http://amatterofdegree.typepad.com/a_matter_of_degree/2006/12/youtubes_extern.htm.*

(Continued)

*Primary Examiner* — Bennett Ingvoldstad
(74) *Attorney, Agent, or Firm* — Fenwick & West LLP (57) ABSTRACT

A system, method and various user interfaces enable association of advertising content with requested shared video content for access via a web-based video player. Advertising content is provided selectively in conjunction with playback of video content. Selection of how and where advertising is displayed is based on a flexibly managed balance between providing sufficiently noticeable opportunities to access advertising information and preserving a satisfying viewer experience in watching requested video content.

33 Claims, 8 Drawing Sheets

U.S. PATENT DOCUMENTS

| | | | |
|---|---|---|---|
| 7,725,502 | B1 | 5/2010 | Badros et al. |
| 7,870,023 | B2 | 1/2011 | Ozer et al. |
| 2002/0078456 | A1* | 6/2002 | Hudson et al. ................. 725/60 |
| 2002/0087402 | A1 | 7/2002 | Zustack et al. |
| 2002/0100041 | A1 | 7/2002 | Rosenberg et al. |
| 2002/0109729 | A1 | 8/2002 | Dutta |
| 2003/0061305 | A1 | 3/2003 | Copley et al. |
| 2003/0083937 | A1 | 5/2003 | Hasegawa et al. |
| 2004/0117827 | A1 | 6/2004 | Karaoguz et al. |
| 2004/0133910 | A1 | 7/2004 | Gordon et al. |
| 2004/0199657 | A1 | 10/2004 | Eyal et al. |
| 2005/0028190 | A1 | 2/2005 | Rodriguez et al. |
| 2005/0034151 | A1 | 2/2005 | Abramson |
| 2005/0137958 | A1 | 6/2005 | Huber et al. |
| 2005/0267813 | A1 | 12/2005 | Monday |
| 2006/0013555 | A1* | 1/2006 | Poslinski ........................ 386/46 |
| 2006/0015904 | A1 | 1/2006 | Marcus |
| 2006/0020966 | A1 | 1/2006 | Poslinski |
| 2006/0048186 | A1 | 3/2006 | Alterman |
| 2006/0053470 | A1 | 3/2006 | Colter et al. |
| 2006/0107285 | A1 | 5/2006 | Medvinsky |
| 2006/0140584 | A1 | 6/2006 | Ellis et al. |
| 2006/0179466 | A1* | 8/2006 | Pearson et al. ................ 725/109 |
| 2006/0214947 | A1 | 9/2006 | Boose et al. |
| 2006/0218577 | A1 | 9/2006 | Goodman et al. |
| 2006/0224693 | A1 | 10/2006 | Gaidemak et al. |
| 2006/0230427 | A1 | 10/2006 | Kunkel et al. |
| 2006/0259588 | A1 | 11/2006 | Lerman et al. |
| 2006/0259589 | A1 | 11/2006 | Lerman et al. |
| 2006/0271977 | A1 | 11/2006 | Lerman et al. |
| 2007/0061203 | A1 | 3/2007 | Ellis et al. |
| 2007/0100699 | A1 | 5/2007 | Ajizadeh |
| 2007/0107010 | A1 | 5/2007 | Jolna et al. |
| 2007/0130015 | A1 | 6/2007 | Starr et al. |
| 2007/0174774 | A1 | 7/2007 | Lerman et al. |
| 2007/0183741 | A1 | 8/2007 | Lerman et al. |
| 2007/0189708 | A1 | 8/2007 | Lerman et al. |
| 2007/0226053 | A1 | 9/2007 | Carl et al. |
| 2008/0021775 | A1* | 1/2008 | Lerman et al. ................. 705/14 |
| 2008/0062127 | A1 | 3/2008 | Brodersen et al. |
| 2008/0109306 | A1 | 5/2008 | Maigret et al. |
| 2008/0109844 | A1 | 5/2008 | Baldeschwieler et al. |
| 2008/0127280 | A1 | 5/2008 | Kuang et al. |
| 2008/0147500 | A1 | 6/2008 | Slaney et al. |
| 2008/0155585 | A1 | 6/2008 | Craner et al. |
| 2008/0250447 | A1 | 10/2008 | Rowe et al. |
| 2008/0270389 | A1 | 10/2008 | Jones et al. |
| 2009/0030802 | A1* | 1/2009 | Plotnick et al. ................. 705/14 |
| 2009/0138904 | A1* | 5/2009 | Kitsukawa et al. ............. 725/23 |
| 2009/0149743 | A1* | 6/2009 | Barron et al. ................. 600/431 |
| 2009/0199230 | A1 | 8/2009 | Kumar et al. |
| 2010/0198697 | A1 | 8/2010 | Brown et al. |
| 2011/0119700 | A1* | 5/2011 | Hamilton ........................ 725/32 |

FOREIGN PATENT DOCUMENTS

| | | |
|---|---|---|
| JP | 2002-111610 A | 4/2002 |
| JP | 2002-314912 A | 10/2002 |
| JP | 2002-534017 A | 10/2002 |
| JP | 2004-240492 A | 8/2004 |
| JP | 2005-006105 A | 1/2005 |
| JP | 2005-073003 A | 3/2005 |
| WO | WO 2007/047645 A1 | 4/2007 |
| WO | WO 2008/033944 | 3/2008 |

OTHER PUBLICATIONS

"How to Embed Windows Media Files." Nov. 24, 2005. http://web.archive.org/web/20051124210305/http://www.mediacollege.com/video/format/windows-media/streaming/embed.html.*

"Ad Serving with RealSystem™ G2," RealNetworks, 1999, 38 pages, [online] [Retrieved on Feb. 13, 2009] Retrieved from the internet <URL:http://service.real.com/help/library/blueprints/adserve/adserve.htm>.

Delaney, Kevin J., "Start-Ups Seek to Cash in on Web-Video Ads", Wall Street Journal, Mar. 2, 2007 [Retrieved Sep. 3, 2008 from http://www.scanscount.com/wsj-070302.html].

Strange, Adario, VideoEgg Exec: YouTube's New Ads are Just Like Ours, [online], Aug. 22, 2007, pp. 1-8, Retrieved from URL:<http://blog.wired.com/business/2007/08/network-wars-vi.html>.

Berg, J., "Google AdSense to Benefit YouTube," iMedia Connection, Oct. 10, 2006, 1 pages, [online] [retrieved on Mar. 22, 2010] Retrieved from the Internet <URL:http://www.imediaconnection.com/content/11634.imc>.

"Idea: How to Put Ads into YouTube," www.adverlab.blogspot.com, Nov. 22, 2006, 1 page, [online] [retrieved on Mar. 22, 2010] Retrieved from the Internet <URL:http://adverlab.blogspot.com/2006/11/idea-how-to-put-ads-intoyoutube.html>.

Anonymous: "Improved Ads for YouTube 1-15 Videos—Overlay Advertising," www.vlogblog.com, Aug. 22, 2007, 1 page, [online] [retrieved on Mar. 24, 2010] Retrieved from the Internet <URL:http://www.vlogblog.com/index.php/arch ives/2007/08/22/improved-ads-for-youtube-videos-overlay-advertising/>.

Supplementary European Search Report for European Patent Application No. EP 08747251, Apr. 20, 2010, 9 pages.

Office Action of the European Patent Office for European Patent Application No. EP 08755012.5, Aug. 30, 2010, 3 pages.

Supplementary European Search Report for European Patent Application No. EP 08755012.5, Apr. 20, 2010, 9 pages.

"www.BrightRoll.com," 2 pages, Archived on Apr. 29, 2007 on web.archive.org [online] [Retrieved on Oct. 19, 2009] Retrieved from the internet <URL:http://web.archive.org/web/20070429110654/http://www.brightroll.com/>.

"www.Scanscout.com," 2 pages, Archived on Apr. 7, 2007 on web.archive.org [online] [Retrieved on Oct. 19, 2009] Retrieved from the internet URL:http://web.archive.org/web/20070407233129/http://www.scanscout.com/>.

"www.YuMe.com," 2009, 1 page, [online] [Retrieved on Oct. 19, 2009] Retrieved from the internet <URL:http://www.yume.com/>.

PCT International Search Report and Written Opinion, PCT/US2008/062442, Jul. 14, 2008.

PCT International Search Report and Written Opinion, PCT/US2008/062103, Aug. 26, 2008.

AJAX Activity Indicators, Archived on Dec. 25, 2006 on www.web.archive.org [Online] [Retrieved on Jun. 10, 2008, Retrieved from the Internet <URL:http://web.archive.org/web/20061225134638/http://www/napyfab.com/ajax-indicators/>.

"Overlay & Video AdType," ScanScout, 2007, [online] [Retrieved on Jul. 15, 2008] Retrieved from the internet <URL://demo.scanscout.com/livedemo.shtml?adType=overlay&videoAdType=right Side&ss . . . >.

Riley, D., "Contextual In-Video Advertising: ScanScout," May 14, 2007, [online] [Retrieved on Jul. 15, 2008] Retrieved from the internet <URL://www.techcrunch.com/2007/05/14/contextual-in-video-advertising-scanscout/>.

PCT International Search Report and Written Opinion, PCT/US2008/066175, Jun. 9, 2009, 8 Pages.

Examiner's First Report on Australian Patent Application No. 2008247732, Jul. 13, 2011, 3 pages.

First Office Action for Chinese Patent Application No. 200880019963.9, May 6, 2011, 15 Pages.

First Office Action for Chinese Patent Application No. 200880019399.0, Apr. 25, 2011, 11 Pages.

Examiner's First Report on Australian Patent Application No. 2008247579, Mar. 19, 2012, 3 pages.

Second Office Action for Chinese Patent Application No. CN 200880019399.0, Apr. 23, 2012, 12 Pages.

Second Office Action for Chinese Patent Application No. CN 200880019963.9, Apr. 26, 2012, 6 Pages.

Third Office Action for Chinese Patent Application No. 200880019963.9, Jan. 18, 2013, 12 Pages.

Communication Pursuant to Article 94(3) EPC for European Patent Application No. EP 08755012.5, Feb. 25, 2013, 8 pages.

Sandoval, G., "YouTube: Too rough for advertisers?" News.com Apr. 21, 2006, 2 pages, can be retrieved at <URL:http://www.news.com/YouTube-Too-rough-for-advertisers/2100-1024_3-6063536.html>.

Notice of Grounds for Rejection for Japanese Patent Application No. P2010-506620, Nov. 13, 2012, 16 Pages.

Notice of Grounds for Rejection for Japanese Patent Application No. P2010-506678, Nov. 20, 2012, 6 Pages.

Oshiba, T., "Personalized Streaming Advertisement Delivering through Internet Broadcasting Services," The 64th Information Processing Society of Japan National Convention Collected Lecture Papers, Mar. 12, 2002, pp. 3-59 to 3-60. With English Summary.

* cited by examiner

USER INTERFACES FOR WEB-BASED VIDEO PLAYER

CROSS-REFERENCE TO RELATED APPLICATIONS

This application claims the benefit of U.S. Provisional Application 60/915,654, filed on May 2, 2007, and incorporated by reference herein in its entirety.

TECHNICAL FIELD

The present invention relates generally to web-based video display and specifically to user interface features for managing video and advertising content in an online content distribution system.

BACKGROUND

The sharing of video content on websites has developed into a worldwide phenomenon, supported by dozens of websites. On average, over 10,000 videos are posted every day, and this number is increasing as the tools and opportunities for capturing video become easy to use and more widespread. Shared video content provides good opportunities to present advertising material to viewers along with the requested video content. However, some mechanisms for delivering advertising with shared video have been relatively ineffective, while others are perceived by users as being objectionable.

People who use video sharing services have a wide range of motivations for using those services. Some are interested in specific information in the shared content, while others are just browsing in a leisurely manner through the content. Advertising that appears in conjunction with the video content, in order to be effective as well as maintain a satisfactory experience for the user, needs to be presented in a manner that takes these widely varying user characteristics into account.

Video content is now delivered to users via a wide range of technologies, each of which has established mechanisms for delivering advertising content. Movies commercially released in DVD format, for example, generally come with trailers for other movies from the same production company. These trailers are often presented automatically when the user seeks to watch the primary program; sometimes it is difficult if not impossible for a user to avoid watching the advertising content. Many users have expressed dismay at the requirement to sit through undesired advertisements, particularly after they have already paid a substantial amount to buy the DVD. Furthermore, the advertising content is often out of date when the DVD is watched some period of time after it is first released. The overall user satisfaction with this sort of advertising has been mixed.

More recently, major television networks have made available some of their programming on their websites. The players that they use typically require a viewer to watch advertising content before, during or after the requested programming. Initial reactions from such websites have also been mixed.

There remains a need for a flexible interface that allows requested video content and advertising to be presented in a manner that is both satisfying to the viewer and effective for advertisers.

SUMMARY

Various systems, methods and software tools enable users who are viewing videos on a website to control certain aspects of their playback experience, and also enable the content provider to provide advertising content in an effective manner.

In one aspect, prior to playback of the requested content, an advertising window is superimposed on a video playback window. In one embodiment, the user is given an option to select or skip the advertisement. The advertisement can be text only, audio, video, or a combination.

In a second aspect, the advertising window is presented as a banner located toward one edge of the video playback window. The banner is presented in opaque or translucent form, as desired.

In another aspect, the advertising window appears during the video playback, rather than before it. In such instance, the selected opacity/transparency of the advertising window is selected based on the amount of attention that is desired to be given to the advertising.

In yet another aspect, the advertising window appears after the video playback. In one variation the window appears as a banner within a larger window of video content related to the content that was just displayed, i.e., material that the user might want to see based on the user's prior selection.

Other aspects of an embodiment are indicators for the viewer as to the amount and placement of the advertising that accompanies requested video content. A timer/slider bar on the player is colored red to indicate portions that correspond to requested video content and yellow to indicate advertising. Timing icons that appear with the advertising make clear to the user how much longer the advertising will take. User interface controls allow the user to cancel advertising content and to move on to subsequent advertising content. User interfaces for advertising content are made distinctive vis-a-vis those for shared video so that the viewer is not confused as to whether any particular content is part of the shared video or advertising.

The features and advantages described in this summary and the following detailed description are not all-inclusive. Many additional features and advantages will be apparent to one of ordinary skill in the art in view of the drawings, specification, and claims hereof.

The figures depict various embodiments of the present invention for purposes of illustration only. One skilled in the art will readily recognize from the following discussion that alternative embodiments of the structures and methods illustrated herein may be employed without departing from the principles of the invention described herein.

DESCRIPTION OF EMBODIMENTS

It is to be understood that the Figures and descriptions of the present invention have been simplified to illustrate elements that are relevant for a clear understanding of the present invention, while eliminating, for the purpose of clarity, many other elements found in a typical web-based video player and method of using the same. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Figure 1:
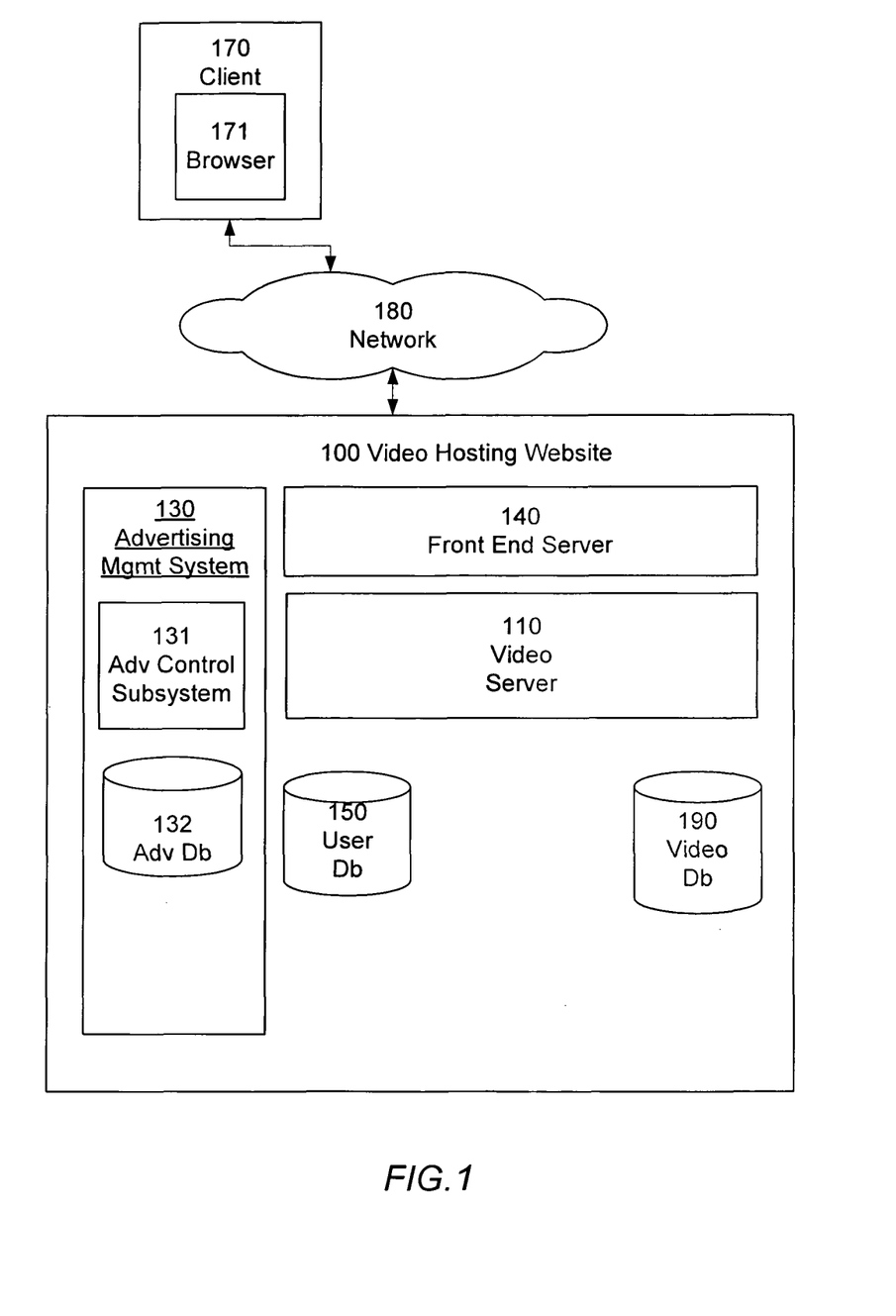
FIG. 1 is a block diagram of a system architecture for providing user interfaces for displaying both advertising and video content.

FIG. 1 is a block diagram of a system architecture in accordance with one embodiment. As shown in FIG. 1, a video hosting website 100 includes a front end server 140, an advertising management system 130, a video server 110 and various databases, including a user database 150 and a video database 190. Many conventional features, such as firewalls, load balancers, application servers, failover servers, site management tools, and so forth are not shown so as to more clearly illustrate the features of the system. A suitable website 100 for implementation of the system is the YOUTUBE™ website, found at www.youtube.com; other video hosting sites are known as well, and can be adapted to operate according the teaching disclosed herein. It will be understood that the term "web site" represents any method of uploading and downloading content and is not intended to be limited to content uploaded or downloaded via the Internet or the HTTP protocol. The various servers are conventionally implemented, whether as a single piece of software or hardware or as multiple pieces of software or hardware. In general, functions described in one embodiment as being performed on the server side can also be performed on the client side in other embodiments if appropriate.

A client 170 executes a browser 171, and connects to the front end server 140 via a network 180, which is typically the Internet, but may also be any network, including but not limited to a LAN, a MAN, a WAN, a mobile, wired or wireless network, a private network, or a virtual private network. While only a single client 170 and browser 171 are shown, it is understood that very large numbers (e.g., millions) of clients are supported and can be in communication with the website 100 at any time. In some embodiments, the browser 171 include a third party video player (e.g., the Flash™ player from Adobe Systems, Inc.), or any other player adapted for the video file formats used in the site 100. Typically, a user accesses a video from the site 100 by browsing a catalog of videos, conducting searches on keywords, reviewing playlists from other users or the system administrator (e.g., collections of videos forming channels), or viewing videos associated with particular user groups (e.g., communities). In some embodiments, browser 171 also accesses a video file indirectly, via an embedded video that is accessed via an embedded hyperlink in a third party website.

Users of the client 170 and browser 171 can upload content (which can include, for example, video, audio, or a combination of video and audio) to the site 100 via the network 180. The uploaded content is processed and placed for storage in the video database 190. This processing can include format conversion, compression, metadata tagging, and other data processing. In some embodiments, an uploaded content file is associated with the uploading user, and so the user's account record is updated in the user database 150 as needed. In some embodiments, other data relating to the user is also placed for storage in database 150. For example, the user may be asked to self-select certain categories or product/service types of interest, for the purpose of allowing the user to self-select various types of content and advertising that the website 100 presents to the user.

For purposes of convenience and the description of one embodiment, the uploaded content will be referred to a "videos" or "video files", but no limitation on the types of content that can be uploaded are intended by this terminology.

The advertising management system 130 stores advertising content to be presented along with the user-requested content. In some instances, the advertising content is in the same format as the user-requested content (e.g., video advertising for a video content request). In other instances, other types of advertising are presented to the user, such as pure text advertising, advertising providing a hyperlink to an advertiser's website, text-and-audio advertising, and still image advertising. An advertising control subsystem 131 both manages access to the advertising content stored in the advertising database 132, and also serves to associate certain advertising content with certain user-requested content. In one embodiment, the association is made solely on the content of the requested video, while in another the association is made based on other factors as well, such as user-specific information stored in the user database 150. Thus, a user who has self-identified as wanting to learn more about new movies may be presented with a greater frequency of movie-oriented advertising content than a user who had not indicated such a preference.

Figure 2:
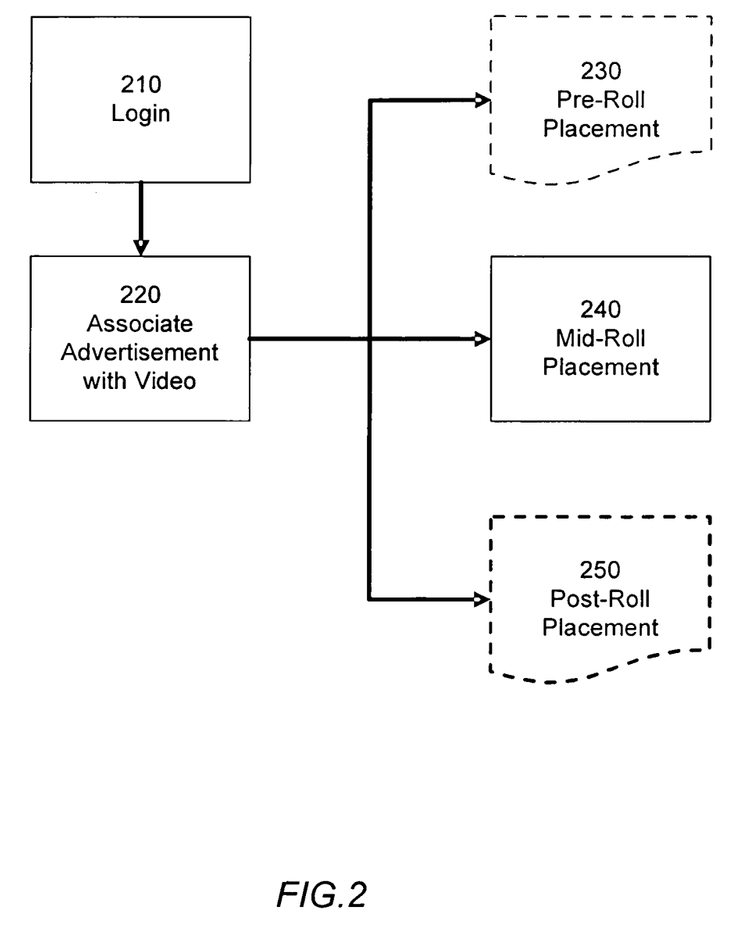
FIG. 2 is a process flow for associating advertising with video.

FIG. 2 illustrates one embodiment of a process for presenting advertising content along with shared video, such as provided via system 130. For the purposes of this explanation, FIG. 2 begins with an administrator logging in 210 to the advertising management system 130. The administrator then selects 220 advertising content to associate with a particular shared video. In one embodiment, this association is made manually. In another embodiment, advertising content is automatically associated with video content. In another embodiment, owners or stewards of the content choose which ads are associated with their content. In some circumstances, such association is random while in other instances, the association may be made based on some aspect of the video content. For example, if a video shows a litter of puppies, metadata for that video may be processed so as to trigger association with advertising content for a pet food company. As mentioned above, metadata concerning a particular user is also used in some embodiments to determine which advertising content to associate with a particular display of a video. In another embodiment, advertising content is chosen in accordance with previous actions or characteristics of the user, so that a first user will view a first ad and a second user will view a different ad when they watch the same video.

Once association 220 is made, the administrator selects the type of advertising display to be used with the video. In one embodiment, when the administrator selects 230 pre-roll advertising (also called pre-watch advertising), the appearance of such a window is provided by superimposing pixels corresponding to the advertising content over the video playback area of the video player before the video begins.

In one embodiment, the advertising content is not actually implemented within a pop-up window, i.e., a separate window that can be positioned with respect to the underlying content, but instead is an unmovable static area integrated into the video content, where the video content is either frozen or animated. Thus, in one implementation, the video with a pre-roll ad playing inside it is sent to the browser as a single, streaming file. In certain situations, this makes it more evident to the viewer that the advertising content is not part of the requested video. In addition, this provides greater user interaction with the advertising content area precisely because while the area looks like a movable window, it is not. If the user attempts to reposition the area, in this embodiment the user will not be able to do so. This leads the user to pay closer attention to the advertising portion of the display, actively dismissing the advertising or selecting to view more information about the advertising. Advertising presented before the requested video plays is referred to as "pre-roll" advertising content. In one embodiment, pre-roll advertising is automatically initiated. In alternate embodiments, the pre-roll advertising only plays if the user actively presses on the advertising portion of the display. In still another embodiment, an interface button is provided within the advertising portion of the display so that the user must click on that button to see the full advertising content.

The pre-roll advertising display portion is, in one embodiment, presented as a fully opaque display. In other embodiments, the advertising portion is partially or fully transparent, so as to allow the user to see both the advertising portion and whatever part of the underlying requested video it covers.

In some embodiments, the advertising content is static. In some embodiments, the advertising content is itself a video.

To keep users from getting discouraged over the time they will need to spend looking at the advertising before seeing the requested video, a progress bar is displayed in some embodiments that shows, whether graphically, by a numeric timer, or both, how much time is left in the display of the advertising content. Further detail on "pre-roll" display of advertising is provided in connection with the discussion of FIG. 4.

In addition to setting "pre-roll" display of advertising content, the administrator can also select 240 "mid-roll" advertising display (also called mid-watch advertising). Mid-roll display differs significantly from pre-roll display in that the user will be presented with advertising content while already enjoying the originally requested video content. Accordingly, in many instances the type of presentation used for the advertising content will need to be different in the pre-roll and mid-roll situations so as not to disrupt the user's overall experience. Thus, in the mid-roll scenario, a less obtrusive display of advertising content may be desirable, depending on the nature of the requested content. As one example, it would likely be rare for a user to be pleased with mid-roll advertising that appears automatically in a manner that totally interrupts the user from viewing the requested video, so that the "auto-initiate" mechanism described above for pre-roll advertising may be unacceptable to the typical user when given mid-roll placement. Further detail on mid-roll advertising display is presented in connection with the discussion of FIG. 5.

As a third option, the administrator may select 250 post-roll placement of the advertising (also called post-watch advertising). This sort of display differs yet again from the pre-roll and mid-roll situations, as the user of a video playback website is typically presented with suggestions for other, potentially related, video content after watching the requested content. In many situations, overall user satisfaction concerns dictate that the user not be distracted too much from making those post-playback selections of related videos; however, it is found that just after playback the user is in a very receptive state for advertisements. Accordingly an effective placement of advertising is found to be one that presents an advertising play button nearby, but distinct from, buttons allowing the selection of suggested videos. In one embodiment, an advertising play button is placed in the same overall window as the buttons for suggested videos, yet separated from the suggested video buttons by user interface controls for sharing the video that has just been watched and for watching the video again. Further detail on post-roll advertising display is presented in connection with the discussion of FIG. 6.

Combinations of pre-roll, mid-roll and post-roll placements may, in certain instances, be desirable. For example, it may be that in a certain type of video, a user is likely to notice and want to see a mid-roll advertising message, but be too interested in the ongoing video content to actually activate a user interface control while the requested video content is playing. In that sort of situation, presenting a post-roll advertising button referencing the same advertiser or the same advertisement as appeared mid-roll may be a solution that satisfies the user's interest in enjoying the video while at the same time providing the user with an opportunity to follow-up on the advertising that appeared mid-roll. Thus, in one embodiment, a same advertisement is presented on post-roll if the user stopped play of the advertisement when it was presented mid-roll. In another embodiment, a same advertisement is presented post-roll whether or not the user stopped the mid-roll advertisement. In another embodiment, the advertisements for any two of pre-roll, mid-roll, and post-roll are related and may be the same advertisement, in order to enforce the advertised content in the user's mind.

The use of a bold line to indicate mid-roll placement 240 in FIG. 2, and dashed lines to indicate pre- or post-roll placements 230,250 is intended to show that the administrator has selected to use mid-roll placements for the situation being illustrated by FIG. 2. However, as noted above combinations of pre-, mid- and post-roll displays are possible, and may be desirable for a particular video or for a particular user profile.

Figure 3:
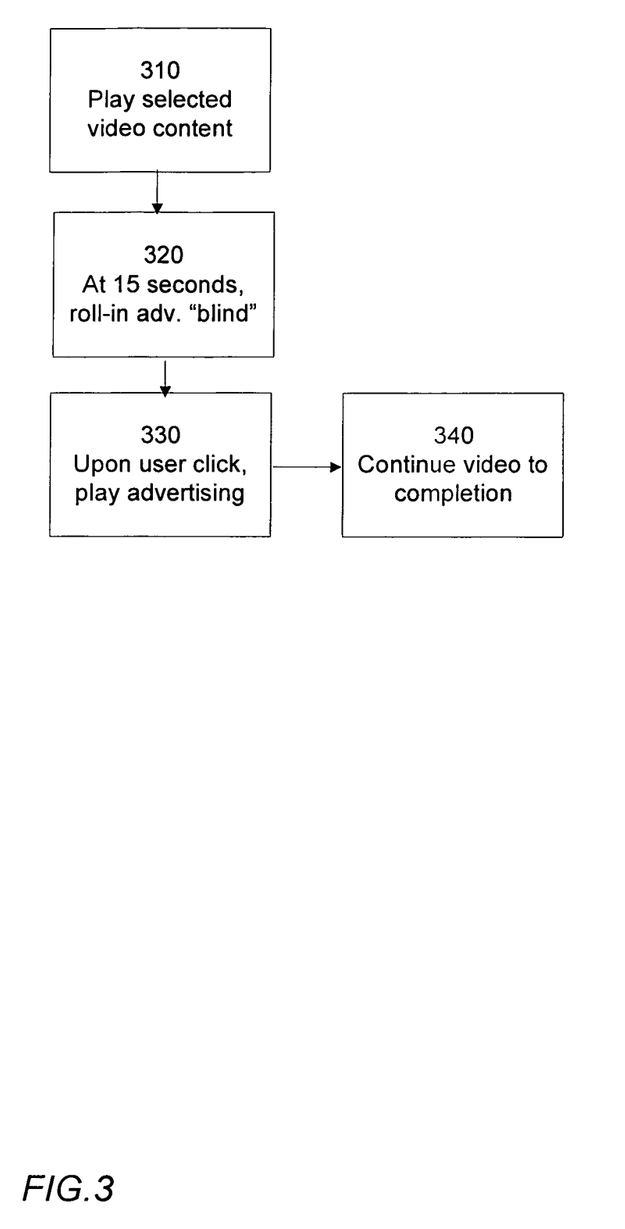
FIG. 3 is a process flow user interaction in a "mid-roll" mode of operation.

Referring now to FIG. 3, a flow diagram is presented for processing to provide the user with mid-roll advertising in accordance with an embodiment. Processing begins when the user activates a conventional user interface control to play 310 the selected video content. The video commences playing. At some point in time, 15 seconds into the video in one embodiment, a user interface banner or "blind" (based on resemblance in appearance to a window blind) appears 320 to the user with advertising content. In one embodiment, the blind is a predominantly rectangular box that appears like a horizontally extended user interface button. The window is large enough to be readily noticed, yet in this embodiment not large enough to significantly impact a typical user's enjoyment of the requested video. In one embodiment, the blind appears by rolling up vertically from the bottom of the video window until it partially obscures a relatively small portion of the bottom of that window. The blind includes a user interface button allowing the viewer to click 330 to watch the advertising immediately, which temporarily suspends playback of the requested video. Once the advertising content has been shown in response to the user click, playback of the originally requested video continues 340 until completion. In one embodiment, the blind disappears after the advertising content has been shown, while in another it remains displayed for a period of time, up to and including the entire duration of the originally requested video. Likewise, if the user never clicks on the button in the advertising blind, the blind may be set to disappear after a period of time or to remain on the screen. In one embodiment the blind is translucent so as not to unduly obscure the requested video, but in some applications it may be preferable to use an opaque blind, for instance to provide an incentive for the viewer to click on the button to show the advertising content so that playback of the originally requested video can then continue without further obstruction by the button.

In one embodiment, the blind rolls up. In another embodiment, the blind rolls horizontally from either the right or left.

Figure 4:
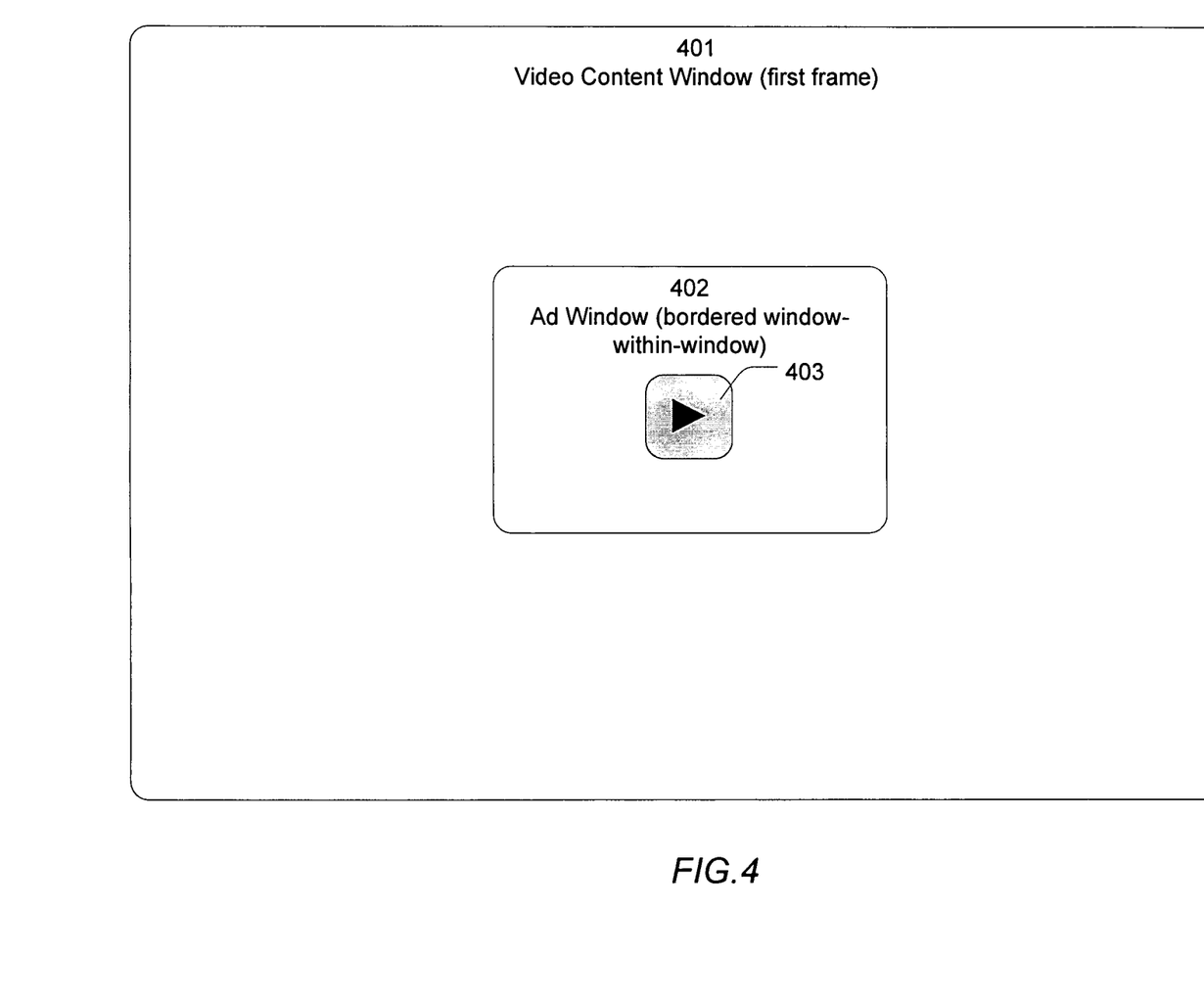
FIG. 4 illustrates a web page implementing an exemplary interface in a "pre-roll" mode of operation.

Referring now to FIG. 4, an exemplary pre-roll display is illustrated. A video content window 401 is displayed, with the first frame (or in some embodiments a representative frame that is not the first frame) of the requested video. Superimposed on the video content window 401 is what appears to be a second window, advertising window 402, in the style of a bordered window-within-window or a conventional pop-up. In the embodiment illustrated in FIG. 4, a large "play" button 403 is prominently displayed within advertising window 402, indicating to a user that the content in advertising window 402 is a video that can be played by pressing button 403. As previously mentioned, window 402 is not actually implemented as a separate window in one embodiment, though to the user it may at first appear to be a pop-up window. A number of existing video content sources, ranging from commercial DVDs to internet television sites, add in advertising content before, i.e., "prepend" advertising to, the primary content desired by users. However, the nature of shared video websites is such that users have a wide variety of interests, some of which may be consistent with pre-roll advertising and others which will not. By selectively allowing pre-roll advertising placement, it can be employed only where it will enhance the overall user experience and avoided where it will be neither effective nor well-received. Because this selection is possible, where pre-roll advertising is selected, it can be implemented in a more aggressive manner than might otherwise be possible. Accordingly, in one embodiment, a default display mode for pre-roll display is through automatic initiation of the advertising content, i.e., without waiting for a user to ask for it. In addition, allowing a portion of the video selected by the user to remain visible on one or more sides of the ad allows the user to remember which video he will be watching after the ad and provides a reminder that the video will be available shortly.

The nature of shared video is such that a user may not always be able to distinguish content from advertising. In many situations, it will be advantageous to clarify for the customer what is advertising and what is the originally requested content. In one embodiment, the video player's conventional control buttons (e.g., time sliders, pause buttons and the like) are grayed out during auto-initiated playback of advertising to more clearly indicate that the user is seeing advertising content rather than the requested video. In one embodiment, an indication of the advertisement's duration is also provided, e.g., progress bar, dynamic clock icon. To further avoid viewer confusion, the word "Advertisement" is displayed as part of the player's border as advertising content is being shown, either inside the video ad or outside of the video ad. Such use of an "Advertisement" legend is also employed in various embodiments in the other advertising windows, blinds and banners detailed below. Further indication that the advertising content is not part of the requested video is made by giving it the appearance of a pop-up window and, as may be appropriate in particular instances, highlighting the borders of the window, highlighting the entire window should the viewer move the mouse over the window, and making the advertising window 402 otherwise differ in user interface appearance and behavior from the remainder of the video content window 401.

As previously noted, users may be more forgiving of pre-roll advertising if they know how long it is going to last. In one embodiment, not only does ad window 402 provide some visual indication, e.g., progress bar, clock icon, of the duration of the advertising content it displays, but such visual indication is visually distinct from whatever indication of video timeframe is provided in the video content window 401. Use of such different timing indicators for video content and advertising content further distinguishes advertising content from the originally requested content. Separate user interface control is also provided to allow a viewer to hear audio related to the advertising content, even if the viewer had chosen to mute the audio of the originally requested content. In one embodiment, this is implemented via a loudspeaker icon control displayed within the ad window 402.

In some embodiments, user experiences may be less satisfying if there is no way to avoid advertising content, which may lead to reduced user satisfaction. Accordingly, in some embodiments, a "close window" icon is provided in ad window 402 to allow the user to remove the ad window 402 entirely and commence with playback of the originally requested video in video content window 401. This "close window" capability is provided as a default in the other advertising windows, blinds and banners discussed below as well.

Figure 5A:
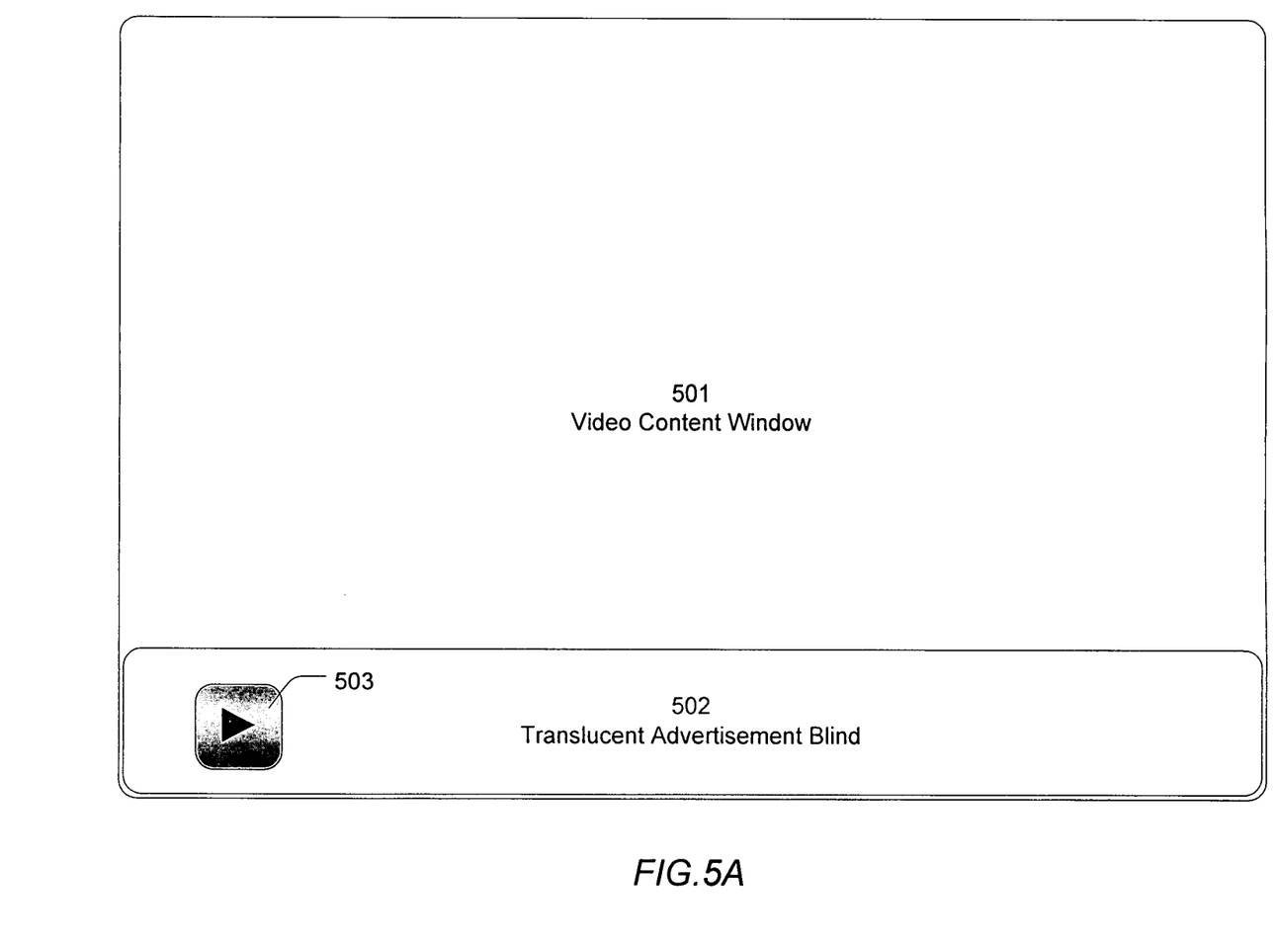
FIG. 5A illustrates a web page implementing an exemplary interface in a "mid-roll" mode of operation.
Figure 5B:
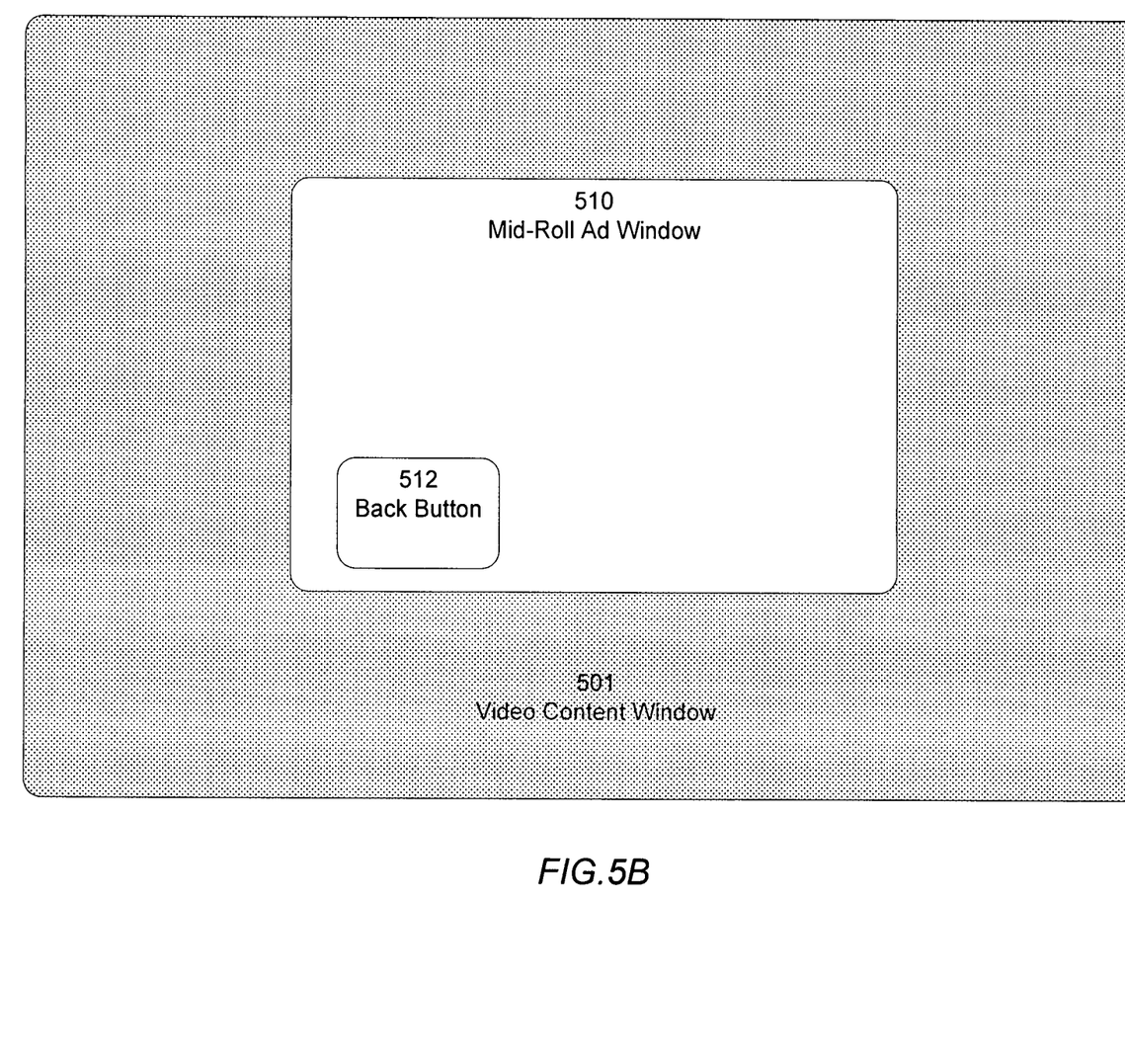
FIG. 5B illustrates a web page implementing an exemplary presentation of "mid-roll" content.

Referring now to FIG. 5A, an example of interface display for mid-roll advertising is illustrated. Video content window 501 is already, in this circumstance, displaying the video that the user requested. As discussed above, at some point a translucent advertisement blind 502 appears (or is rolled up) superimposed on a portion of video content window 501; in one embodiment the originally requested video continues to play without interruption. Blind 501 can provide access to a variety of advertising content which, when selected, will pause the current video. For instance, a link to a website may be presented on the blind, preferably with the linked site providing a "back" button to resume playback of the requested video once the website has been reviewed by the user. Instead of, or in addition to, a website link, an advertising video can be presented on the blind. In one embodiment, a thumbnail frame of such video is displayed, along with a user interface "play" button 503 to allow the viewer to initiate the advertising video. In one embodiment, selected advertising content (e.g., a video or a website) may be presented in a mid-roll advertisement window 510 as illustrated in FIG. 5B. In one embodiment, the paused video in the video content window 501 is grayed out while the advertisement is presented. The back button 512 can be selected to resume playback of the requested content. In one embodiment, playback of the requested video resumes once the advertising video has been fully played back or cancelled by the user.

Figure 6:
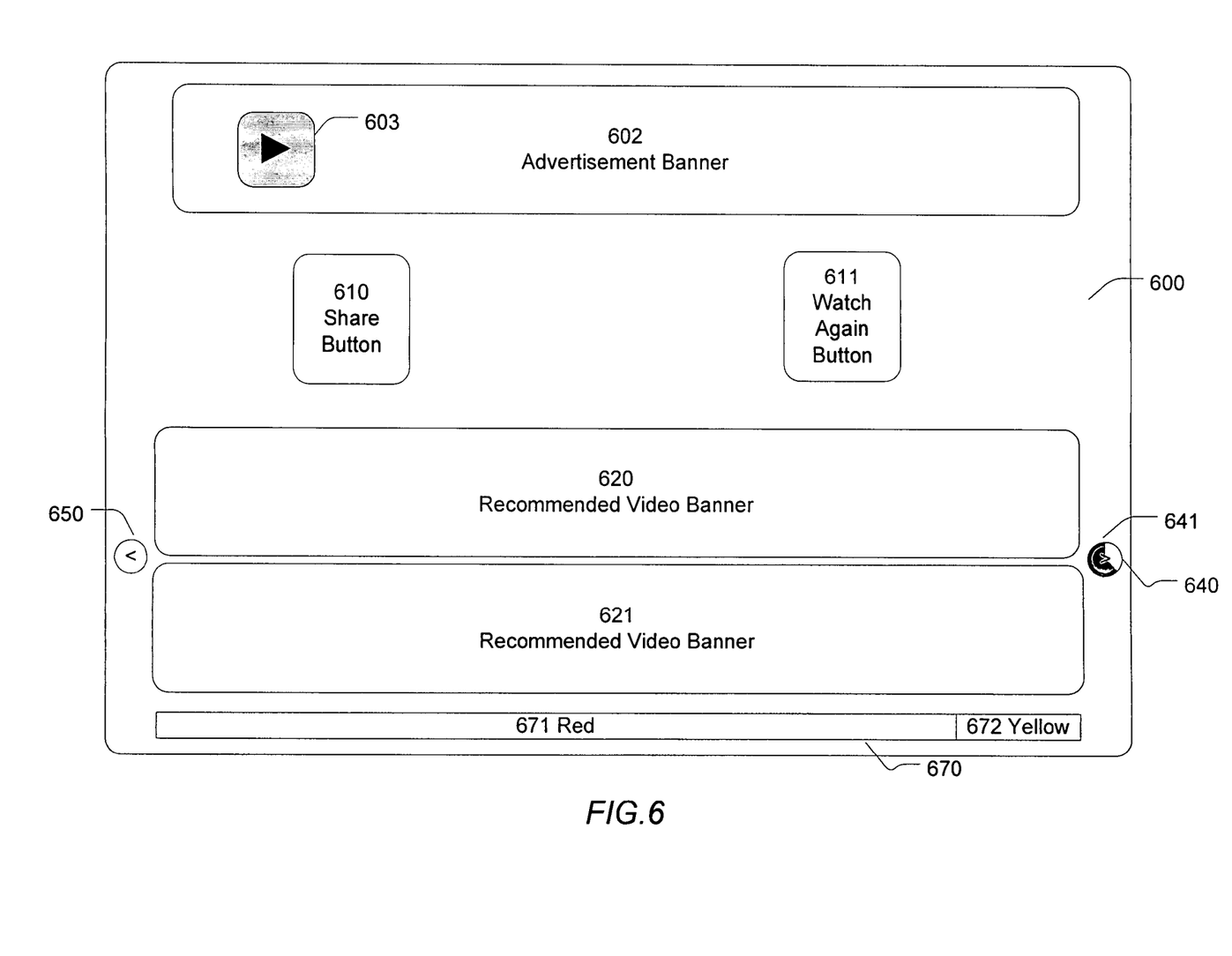
FIG. 6 illustrates a web page implementing an exemplary interface in a "post-roll" mode of operation.

Turning now to FIG. 6, an exemplary post-roll advertising interface 600 is shown. In this example, the background of interface 600 is simply the final frame (or a representative frame) of the video that the viewer just finished watching. In addition, the viewer is presented not only with banners 620, 621 recommending videos for the viewer to request, such as those that are highly rated or often requested by people who have seen the video that was just shown to the viewer, but also with an advertising banner 602. In many applications, a user will appreciate not getting confused between what is a shared video and what is an advertisement, so in one embodiment the advertisement banner 602 is distinctly positioned above the suggested video banners 620, 621, and separated from them by other user interface buttons, e.g., the "share" and "watch again" buttons 610, 611. Further distinction is achieved by making the advertisement banner 602 opaque and the recommended video banners 620, 621 translucent, and by placing an "Advertisement" legend on the advertisement banner 602 as previously discussed. As with the pre-roll and mid-roll scenarios, a "play" button 603 indicates that the advertising content is video. In other applications, it may be considered desirable to minimize or even remove such distinctions, and in some embodiments the administrator can make those choices when associating advertising content with a video. It should be recognized that, particularly in the case of post-roll advertising, the advertising content may not be an advertisement per se, but is in some applications sponsored video content. In such applications, an appropriate legend, e.g., "sponsored content" is used if it is desired to distinguish such content from other shared video.

Usability of interface 600 is enhanced by its simple appearance, yet it is typically desirable to provide a viewer with a fairly large number of recommended videos. In practice, it is found that providing a relatively small number of proposed videos, e.g., via banners 620, 621, and then every few seconds changing the videos that are proposed on those buttons, provides a satisfying user experience. In one embodiment, an administrator can select to have multiple advertisements associated with a selected video, and when one advertisement plays, a "next" button on that ad allows a user to immediately skip to the next ad.

Another selection that can be made by an administrator is to have website links superimposed upon a video advertisement so that anytime during playback of the advertisement, the viewer can choose to go to a website associated with the advertisement. For added visibility, for example in light-background video advertisements, a horizontal translucent shading bar helps direct the viewer's eyes to the displayed URL for the website, as well as other user interface controls (e.g., the "next" button).

Rather than immediately starting playback of a video advertisement, which may be unduly distracting to viewers, in one embodiment only the first frame of a video advertisement initially is shown, along with a large "play" button icon in the center of the advertisement screen. This is found to strongly suggest to the user to play the video advertisement without the distraction that automatic initiation might impose, or the risk that the ad might run when the user is not actually viewing the window. For ads that are images rather than videos, display is the same, other than not having the large "play" button icon.

Also in one embodiment, a timer/slider bar 670 appears in interface 600 that provides indication of playback and loading progress, as well as fast user control of forward and backward placement within the requested video. In addition, this interface is displayed in two colors: one to represent requested video content and another to represent advertising content. In one embodiment, a red portion 671 represents requested content and a yellow portion 672 represents advertising content. With this interface, a user navigating through a video can readily tell how much advertising accompanies a requested video, as well as where it is.

In an alternate embodiment, interface 600 further distinguishes advertising content from recommended video content by including video banners e.g., 620, 621, but not including any advertisement banner 602. Rather than a banner, advertising is displayed in this embodiment with only textual content (with or without a link to an advertiser's website), for example at the bottom of interface 600.

In one embodiment, insertion of advertising content is facilitated by using a format that is compatible with existing/future web advertising standards, e.g., 25 character maximum header, two-line (approximately 70 character maximum) description, and 35 character maximum display URL.

Figure 7:
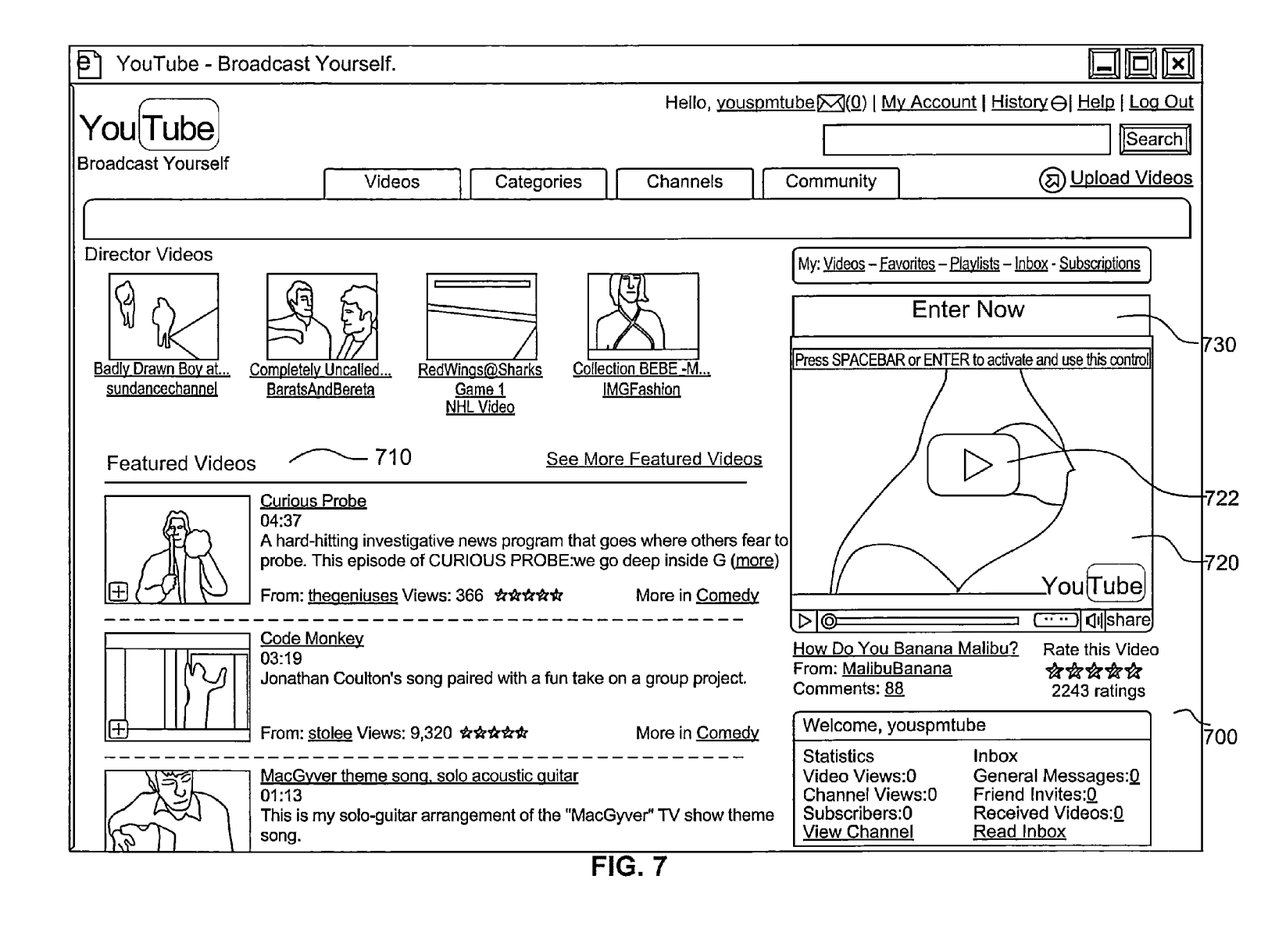
FIG. 7 illustrates an exemplary interface for a video website with integrated advertising content.

Referring now to FIG. 7, an interface 700 for a shared video playback website integrates advertising controls with other content. As illustrated in FIG. 7, along with the website's selection of featured videos 710 is a window 720 representing video advertising content, playable by the user through activation of a prominent "play" button 722. In this embodiment, window 720 provides control features including a slider bar and loudspeaker icon, and further permits the advertising video to be rated using a one-to-five star rating system in the same way that the other videos, e.g., the featured videos 710, are rated.

As shown in FIG. 7, in addition to an advertising video 720, interface 700 also includes an image advertising portion 730. In one embodiment, clicking on the image advertising portion 730 links to a website related to the advertising video 720. In another embodiment the image advertising portion 730 is not related to the advertising video 720. The area 730 may be offered first to the advertiser who provides the video 720 and offered to others if that advertiser chooses not to use the location 730.

The above described interface and related methods are readily customized by an administrator to best address a particular application, and are further customizable to respond as more knowledge is obtained concerning what experiences viewers most enjoy and what modes of presenting information are most helpful to advertisers. In some embodiments, advertisers themselves can reserve locations and schedule play times on the web page for their ads. For example, an advertiser may decide to run his video ad at certain times of the day, when certain videos or categories of video are shown or when certain categories of users are viewing the page.

In FIG. 7, the video ad user interface includes a title ("How do you banana Malibu"), a source ("From: BananaMalibu"), an opportunity for users to provide comments (both written comments and video comments) and a total number of people who have rated the video, and a share button that allows a user to forward a link to the advertisement to other users. The share button therefore affords additional viewing opportunities. Various implementations may use some or all of these elements. Some embodiments provide a user interface to control volume (as shown here by the loudspeaker icon). Some embodiments allow a user to mark an advertisement video as a favorite or to subscribe to a channel of advertisements from the same source, about similar topics, or from a user-selected list of advertisers. In such implementations, advertisers can choose whether to participate in channel feeds and the like, either globally or on a per video basis. In some implementations, advertisement videos are available only for a limited time, even when favorited. In various embodiments, this limited time may be determined by the system or set by the advertiser.

Reference in the specification to "one embodiment" or to "an embodiment" means that a particular feature, structure, or characteristic described in connection with the embodiments is included in at least one embodiment of the invention. The appearances of the phrase "in one embodiment" or "a preferred embodiment" in various places in the specification are not necessarily all referring to the same embodiment.

Some portions of the above are presented in terms of methods and symbolic representations of operations on data bits within a computer memory. These descriptions and representations are the means used by those skilled in the art to most effectively convey the substance of their work to others skilled in the art. A method is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of a method. It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

We claim:

1. A method for providing video content in a web-based video player, comprising:
   transmitting to a video hosting service, a user request for video content;
   loading a representative frame of the requested video content to a video playback window prior to beginning playback of the user-requested video content;
   superimposing a pre-roll advertising window on the video playback window;
   presenting pre-roll advertising in the pre-roll advertising window responsive to a first user interaction received prior to beginning playback of the video content;
   presenting the video content in the video playback window responsive to a second user interaction;
   presenting, in a mid-roll advertising window superimposed on the video playback window, a first user control to initiate a mid-roll presentation of advertising in the mid-roll advertising window and a second user control to skip the mid-roll presentation of the advertising;
   responsive to selection of the second user control to skip the mid-roll presentation of advertising, removing the mid-roll advertising window from display, presenting a second presentation of the video content in the video playback window, and presenting a same advertising as skipped during the mid-roll presentation of the advertising in a post-roll presentation of advertising;
   responsive to selection of the first user control to initiate the mid-roll presentation of the advertising, presenting the mid-roll presentation of the advertising, and presenting, in a post-roll presentation of advertising, a different advertising than that presented during the mid-roll presentation of advertising;
   presenting together with the post-roll presentation of advertising, a banner identifying a recommended video related to the video content requested by the user;
   presenting together with the post-roll presentation of advertising, an interface button for sharing the video content requested by the user; and
   presenting together with the post-roll presentation of advertising, an interface button for replaying the video content requested by the user.

2. The method of claim 1, wherein presenting the advertising in the pre-roll advertising window is responsive to receiving a user selection of a control for initiating presentation of the pre-roll advertising.

3. The method of claim 1, wherein presenting the video content in the video playback window is responsive to a user selection of a control for skipping the pre-roll advertising.

4. The method of claim 1, wherein presenting the video content in the video playback window is responsive to a user selection of a control for initiating presentation of the video content.

5. The method of claim 1, wherein presenting the video content in the video playback window is responsive to presentation of a user control for initiating playback of the pre-roll advertising and the user failing to actuate the user control for initiating playback of the pre-roll advertising.

6. The method of claim 1, wherein the pre-roll advertising window comprises a static window that cannot be moved by the user.

7. The method of claim 1, wherein the pre-roll advertising window is translucent such that the representative frame displayed within the video playback window is at least partially visible behind the pre-roll advertising window.

8. The method of claim 1, further including displaying an indicator showing temporal placement and duration of the pre-roll advertising relative to the video content.

9. The method of claim 8, wherein displaying an indicator further includes showing playback and loading progress.

10. The method of claim 1, wherein presenting advertising in the pre-roll advertising window further includes displaying a progress indicator indicating remaining time of the pre-roll advertising.

11. The method of claim 1, wherein the second user interaction includes user selection of a control for canceling the pre-roll advertising during the presenting of pre-roll advertising.

12. The method of claim 1, further comprising selecting the pre-roll advertising responsive to correspondence with the video content.

13. The method of claim 1, wherein the first user interaction is distinct from the second user interaction so as to allow user discrimination between the pre-roll advertising and the video content.

14. The method of claim 1, wherein superimposing the pre-roll advertising window includes presenting the pre-roll advertising window in a visually distinct manner from the video playback window.

15. A method of providing video content, comprising:
presenting the video content in a video playback window of a web-based video player;
presenting, in a mid-roll advertising window superimposed on the video playback window, a first user control to initiate a mid-roll presentation of advertising and a second user control to skip the mid-roll presentation of the advertising;
responsive to selection of the second user control to skip the mid-roll presentation of advertising, removing the mid-roll advertising window from display, presenting a second presentation of the video content in the video playback window, and presenting a same advertising as skipped during the mid-roll presentation of the advertising in a post-roll presentation of advertising;
responsive to selection of the first user control to initiate the mid-roll presentation of the advertising, presenting the mid-roll presentation of advertising, and presenting, in a post-roll presentation of advertising, a different advertising than that presented during the mid-roll presentation of advertising;
presenting together with the post-roll presentation of advertising, a banner identifying a recommended video related to the video content requested by the user;
presenting together with the post-roll presentation of advertising, an interface button for sharing the video content requested by the user; and
presenting together with the post-roll presentation of advertising, an interface button for replaying the video content requested by the user.

16. The method of claim 15, further comprising moving the mid-roll advertising window on the video playback window in an animated manner.

17. The method of claim 15, wherein the mid-roll advertising window on has a predetermined level of opacity corresponding to a desired amount of attention for the advertising.

18. The method of claim 15, wherein presenting the mid-roll advertising window superimposed over the video playback window includes sliding the mid-roll advertising window into the video playback window.

19. The method of claim 15, further comprising selecting the mid-roll presentation of advertising responsive to correspondence with the video content.

20. The method of claim 15, wherein presenting the first user control includes providing user distinction between the mid-roll presentation of advertising and the video content.

21. The method of claim 15, wherein the video content being played in the video playback window is paused during the mid-roll presentation of the advertising.

22. The method of claim 15, wherein the video content being played in the video playback window is grayed out during the mid-roll presentation of the advertising.

23. The method of claim 15, wherein the mid-roll advertising window comprises a translucent advertising window including animated content.

24. The method of claim 15, wherein the mid-roll advertising window covers less than half the video playback window.

25. The method of claim 15, wherein the mid-roll advertising window is rolled up over a portion of the video playback window in an animated manner.

26. The method of claim 15, wherein the first user control to initiate the mid-roll advertising window includes a play button a play button displayed along with a thumbnail frame of the mid-roll presentation of advertising.

27. An advertising management system, comprising:
an advertising database storing a plurality of advertisements;
a video database storing a plurality of videos selectable via a video hosting web site;
an advertising control subsystem coupled with the video database and the advertising database, the subsystem configured to establish correspondences among select items from the advertising database and select items from the video database for presentation to a user; and
a video hosting service configured to:
present video content in a video playback window of a web-based video player;
present, in a mid-roll advertising window superimposed on the video playback window, a first user control to initiate a mid-roll presentation of advertising and a second user control to skip the mid-roll presentation of the advertising;
responsive to selection of the second user control to skip the mid-roll presentation of advertising, remove the mid-roll advertising window from display, present a second presentation of the video content in the video playback window, and present a same advertising as skipped during the mid-roll presentation of the advertising in a post-roll presentation of advertising;
responsive to selection of the first user control to initiate the mid-roll presentation of the advertising, present the mid-roll presentation of the advertising, and present, in a post-roll presentation of advertising, a different advertising than that presented during the mid-roll presentation of advertising;
presenting together with the post-roll presentation of advertising, a banner identifying a recommended video related to the video content requested by the user;
presenting together with the post-roll presentation of advertising, an interface button for sharing the video content requested by the user; and
presenting together with the post-roll presentation of advertising, an interface button for replaying the video content requested by the user.

28. The system of claim 27, wherein the advertising control subsystem is further coupled to a user database and is further configured to establish said correspondences responsive to user information stored in the user database.

29. A method performed by a computer system, comprising:
   receiving a request for user-selected video content;
   presenting, in a advertising window superimposed on a video playback window, a first user control to initiate a first presentation of advertising and a second user control to skip the first presentation of the advertising;
   responsive to selection of the second user control to skip the first presentation of advertising, removing the advertising window from display, playing the user selected video content in the video playback window, and presenting a same advertising as skipped during the first presentation of advertising in a second presentation of advertising;
   responsive to selection of the second user control to initiate the first presentation of the advertising, presenting the first presentation of the advertising in the advertising window, presenting the user-selected video content in the video playback window, and presenting, in a second presentation of advertising, a different advertising than that presented during the first presentation of advertising;
   presenting together with the second presentation of advertising, a banner identifying a recommended video related to the video content requested by the user;
   presenting together with the second presentation of advertising, an interface button for sharing the video content requested by the user; and
   presenting together with the second presentation of advertising, an interface button for replaying the video content requested by the user.

30. A non transitory computer-readable storage medium storing computer program instructions executable by a processor for providing video content, the program instructions when executed cause the processor to perform steps including:
   presenting the video content in a video playback window of a web-based video player;
   presenting, in a mid-roll advertisement window superimposed on the video playback window, a first user control to initiate a mid-roll presentation of advertising and a second user control to skip the mid-roll presentation of the advertising;
   responsive to selection of the second user control to skip the mid-roll presentation of advertising, removing the advertisement window from display, presenting a second presentation of the video content in the video playback window, and presenting a same advertising as skipped during the mid-roll presentation of the advertising in a post-roll presentation of advertising;
   responsive to selection of the first user control to initiate the mid-roll presentation of the advertising, presenting the mid-roll presentation of the advertising, and presenting, in a post-roll presentation of advertising, a different advertising than that presented during the mid-roll presentation of advertising;
   presenting together with the post-roll presentation of advertising, a banner identifying a recommended video related to the video content requested by the user;
   presenting together with the post-roll presentation of advertising, an interface button for sharing the video content requested by the user; and
   presenting together with the post-roll presentation of advertising, an interface button for replaying the video content requested by the user.

31. The computer-readable storage medium of claim 30, wherein the mid-roll advertising window comprises a translucent advertising window.

32. The computer-readable storage medium of claim 30, wherein the mid-roll advertising window is rolled up over a portion of the video playback window in an animated manner.

33. The computer-readable storage medium of claim 30, wherein the first user control to initiate the mid-roll advertising window includes a a play button displayed along with a thumbnail frame of the mid-roll presentation of advertising.

* * * * *

UNITED STATES PATENT AND TRADEMARK OFFICE
CERTIFICATE OF CORRECTION

PATENT NO. : 8,468,562 B2
APPLICATION NO. : 12/114398
DATED : June 18, 2013
INVENTOR(S) : Christoform Miller et al.

It is certified that error appears in the above-identified patent and that said Letters Patent is hereby corrected as shown below:

In the Claims:

Column 14, lines 23 and 24, delete "a play button a play button" insert --a play button--.

Column 16, line 38, delete "a a" insert --a--.

Signed and Sealed this
Eighth Day of October, 2013

Teresa Stanek Rea
*Deputy Director of the United States Patent and Trademark Office*